Nov. 11, 1941. W. G. LUNDQUIST ET AL 2,262,022
ENGINE PRESSURE REGULATOR
Filed March 4, 1939 2 Sheets-Sheet 1
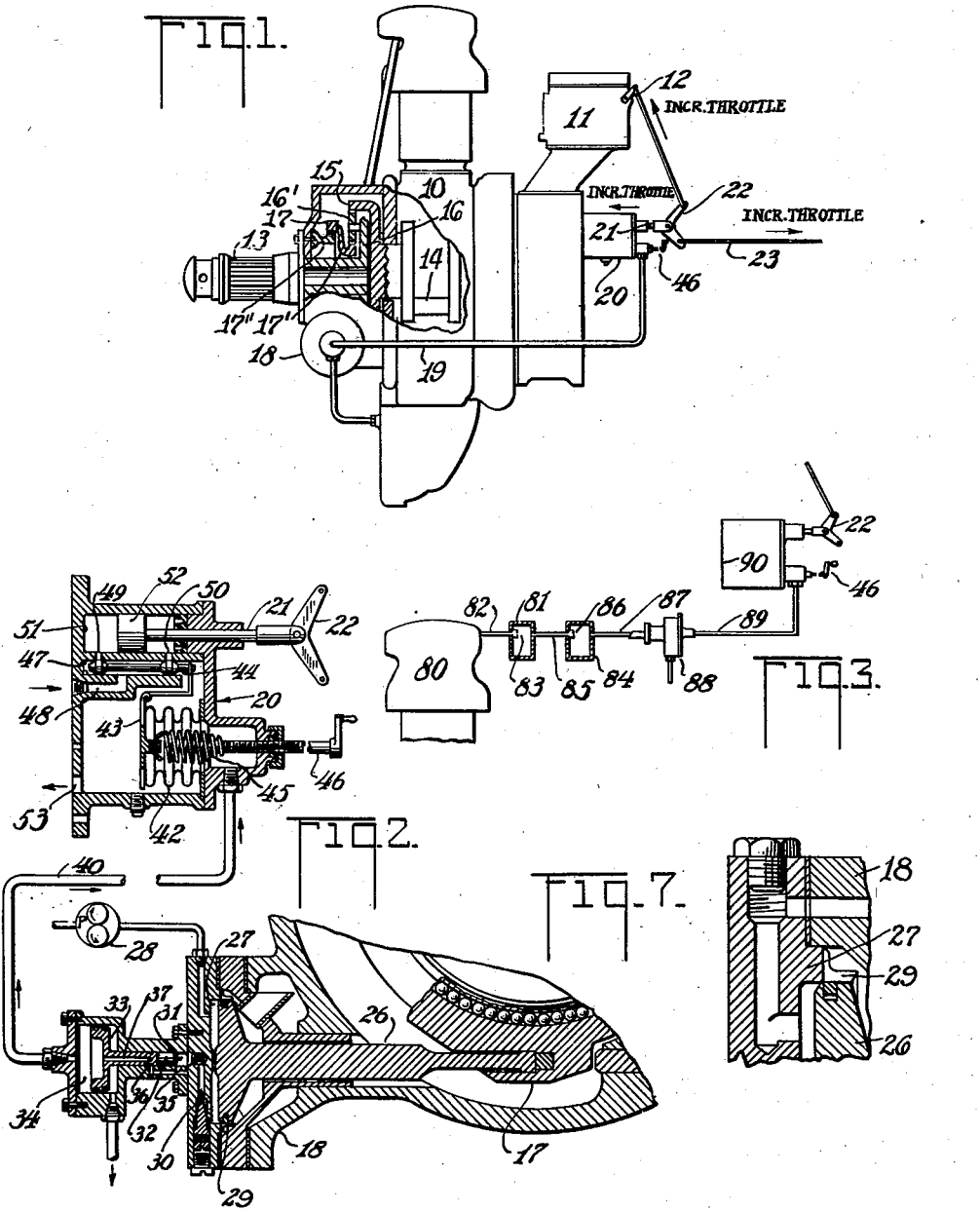
INVENTORS
WILTON G. LUNDQUIST AND
ROLAND CHILTON
BY
ATTORNEY

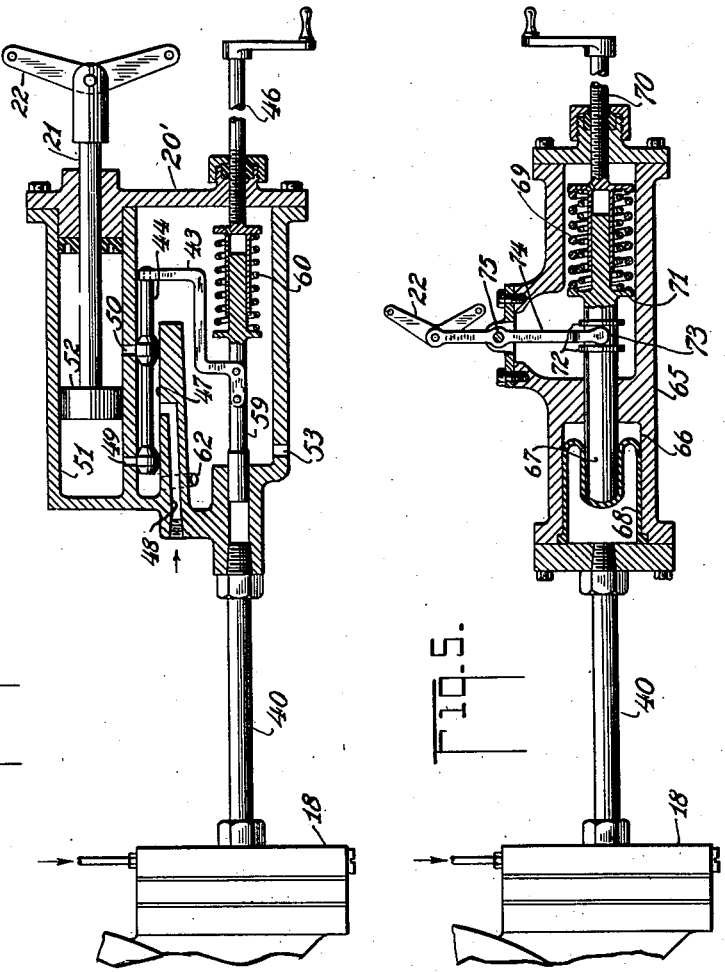
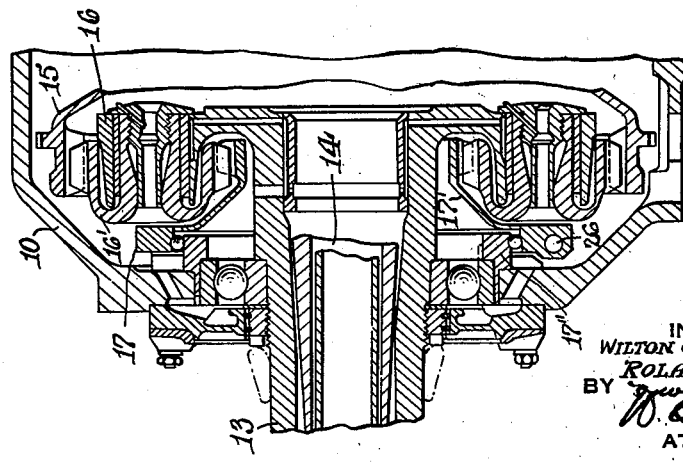

Patented Nov. 11, 1941

2,262,022

UNITED STATES PATENT OFFICE 2,262,022

ENGINE PRESSURE REGULATOR

Wilton G. Lundquist, Glen Rock, and Roland Chilton, Ridgewood, N. J., assignors to Wright Aeronautical Corporation, a corporation of New York Application March 4, 1939, Serial No. 259,786

4 Claims. (Cl. 123—103)

This invention relates to means for controlling the torque and power outputs of internal combustion engines. The primary factor determining the torque (and therefore the power output at constant speed) is the manifold pressure, which is controlled by the throttle and automatic devices for maintaining constant manifold pressure, such devices being old in the art.

Except when conditions as to manifold temperatures, mixture strength and cylinder temperatures are held constant, manifold pressure is only an approximate index of the actual output torque and hence in practical power control technique, it is necessary for the operator to use correction factors to cover these variations.

The prime object of the present invention is to provide automatic manifold pressure control responsive to the actual torque output of the engine regardless of the instant temperature and mixture strength conditions. The control for the manifold pressure regulating device is, according to the teachings of this invention, derived from fluid pressure governed to be directly proportional to the true engine torque.

It is a further object of this invention to provide a throttle adjusting system which is responsive directly to the actual output torque of the engine or to the mean pressure in the engine cylinders which is truly proportional to torque. It is a further object of the invention to devise an automatic throttle adjusting means which may at any time be overcontrolled by an operator. Objects of the invention further comprise the provision of a torque adjusting device actuated by engine oil pressure and sensitive to changes in torque as measured by torque meters which have been developed for particular application to aircraft engines. Still another object is to provide an automatic throttle adjusting device which may be directly actuated by fluid pressures resulting from torque either with or without the interposition of a servo mechanism.

Further objects will become apparent in reading the annexed description in connection with the drawings, in which Fig. 1 is a side elevation of an aircraft engine incorporating the mechanism of the invention;

Fig. 2 is a composite section of devices which comprise the control system;

Fig. 3 is a diagrammatic elevation, partly in section showing an alternate control arrangement;

Figs. 4 and 5 are respectively sections through alternate embodiments of the invention;

Fig. 6 is an enlarged section through an engine reduction gear showing same in a more detailed manner than is indicated in Fig. 1; and Fig. 7 is an enlarged detailed section of a portion of Fig. 2.

Referring first to Fig. 1, we show an engine 10 indicated as a radial air-cooled engine. The rear end of the main housing carries a carburetor 11 provided with a throttle lever 12. From the front end of the engine a propeller shaft 13 projects which is driven from a crankshaft 14 through a reduction gear. This reduction gear includes a bell gear 15 on the crankshaft 14 which engages planet pinions 16' journalled on a spider 16 which is rigid with the propeller shaft 13. An oscillating but non rotating sun or reaction gear 17' is carried by a hub 17 on an annular bracket 17" secured to the engine nose. The reaction gear hub 17 is associated with a torque meter 18 in a manner which should be apparent from Fig. 2. The specific details of the reduction gear and of the torque meter form no specific part of the present invention and some of the specific details of such a torque meter are shown in the co-pending application of Roland Chilton, Serial No. 248,052, filed December 28, 1938.

Figs. 2, 4 and 5 show embodiments utilizing such a torque meter and Figs. 2 and 7 show the torque meter construction. Referring again to Fig. 1, the torque meter 18 produces hydraulic pressure in a pipe 19 which is proportional to engine torque, the pipe 19 communicating with an automatic throttle control mechanism 20, this mechanism carrying a slidable rod 21 to which a bell crank 22 is pivoted at its center. The ends of the bell crank 22 are respectively connected to the throttle lever 12 and to a manual throttle control through a rod 23. The rod 21 is automatically controlled axially, in a manner shortly to be described, and it will be seen that if the rod 23 is fixed, sliding of the rod 21 to the left will increase throttle opening. If the rod 21 be relatively fixed, movement of the rod 23 to the right will serve to increase throttle opening. Assuming a fixed hand throttle, the rod 21 will be moved to the left should torque developed by the engine decrease, thus causing an increase in throttle opening and an increase in torque until a balanced condition is reached.

Now referring to Figs. 2 and 7 it will be seen that the torque meter 18 comprises a piston 26 the head of which is slidable in a cylinder 27, the opposite end of the piston 26 abutting against the reaction gear hub 17. A hydraulic pump 28 continually feeds fluid to the cylinder 27 and thus pressure will build up within the cylinder until the piston is moved to the right to uncover ports 29 in the cylinder to bleed excess oil therefrom. This mechanism maintains in the cylinder 27 a pressure proportional to the torque reaction from the gear hub 17. This pressure will be of the order of several hundred pounds per square inch and the fluid is led through a damping valve 30 to a small cylinder 31 fitted with a piston 32 integral with a large piston 33 slidable in a cylinder 34. In the housing of the cylinder 31, a port 35 is provided which communicates through a suitable drilling to a valve groove 36 in the cylinder 32, the groove communicating through a central drilling 37 in the piston, with the cylinder 34. This last described mechanism comprises a pressure reducing valve so that the pressure in the cylinder 34 is continually proportional to that in the cylinder 27 in a ratio determined by the relative areas of the piston 32 and the piston 33. The low pressure existing in the cylinder 34 is communicated through a conduit 40 to the control device 20 which in effect is a servo control to adjust the position of the rod 21 in accordance with the torque-proportional pressure. The unit 20 comprises a bellows 42 subject to fluid pressure from the conduit 40, the bellows carrying a valve arm 43 and a valve 44, the bellows being balanced by a spring adjustable as to force imposed by a screw control 46. The valve 44 is seated in a chamber 47 supplied with engine presure oil in its mid-portion through a passage 48, spaced portions of the chamber 47 communicating through ports 49 and 50 with a cylinder 51 in which is a piston 52 which controls the rod 21. The valve 44 serves to place one or the other end of the cylinder 51 in communication with engine oil pressure source to effect movement of the piston 52, the opposite opening in the cylinder being coincidentally connected with the interior of the unit 20 which is drained through an opening 53, the ends of the chamber 47 freely communicating with the interior of the device 20.

The operation of the mechanism above described is as follows: The adjusting screw 46 may be preset for any desired engine torque and with the engine idle, the spring 45 will hold the valve 44 in such a position that engine oil flows into the right hand end of the cylinder 51 to effect an increase in throttle opening. As the torque of the engine increases to the desired value, pressure fluid will enter the bellows 42, deflecting the spring 45 to close the valve 44, holding the throttle in that position which maintains the desired torque preset by the control 46. Any variations in torque thereafter will be compensated by increasing or decreasing the throttle opening so that the preset torque is maintained within reasonable operating limits.

Fig. 4 shows an alternative arrangement similar in principal to that of Fig. 2, wherein fluid pressure from the torque meter 18 is imposed through a piston 59 against the adjustable balancing spring 60, a valve arm 43 and valve 44 functioning in response to torsional variations in the previously described manner. A drain passage 62 provides for exit oil flow from the left hand end of the cylinder 51 to the drain opening 53 when the valve 44 is moved toward the right. The unit in Fig. 4 is designated as 20' and elements therein having similar functions to the device 20 are indicated by the same reference characters.

In Fig. 5 pressure fluid from the torque meter 18 is carried through the conduit 40 to an adjusting device 65 which comprises at its left hand end a cylinder 66 within which a plunger 67 is slidable, the plunger being sealed with respect to the cylinder by a flexible sleeve 68. The plunger 67 extends to the right into a cavity in the device which contains a plurality of stout springs 69, adjustable as to their compression by a screw device 70, these springs bearing upon a flange 71 on the plunger. Thus, the springs 69 serve to balance directly the pressure from the torque meter. The plunger is provided with flanges 72 on opposite sides of a yoke 73 which is the inner terminal for a lever 74 pivoted at 75 to the device and extending therebeyond to carry the bell crank 22 to which throttle connections are made as previously described. In this embodiment the bell crank 22 is operated directly, without the interposition of a servo mechanism, by the torque meter pressure. Since the torque meter pressure available is high, the diameter of the plunger 67 may be made moderately small and the spring 69 may be sufficiently stiff so that considerable force may be imposed upon the bell crank 22 without appreciably altering the position of the lever 74. Since the throttle control rod, such as 23 in Fig. 1 is subjected to a friction drag of about 40 lbs., it will be appreciated that the stability of the lever 74 must be quite great in order not to deflect unduly when throttle moving forces are imposed manually by the operator.

The servo arrangement shown in Figs. 2 and 4 provide an irreversible hydraulic positioning device for the bell crank 22 which is not alterable due to manually imposed throttle changing forces. The particular arrangement of Fig. 2 is convenient in that the device 20 shown therein is substantially identical structurally with an existing manifold pressure responsive throttle control device. The three arrangements of Figs. 2, 4 and 5 respectively are virtually identical in principal but differ in the order of torque proportional pressures by which they are operated.

The arrangement of Fig. 3 shows an apparatus which is operated directly by the mean pressure existing within the engine cylinder which, of course, is proportional to torque. In this arrangement, an engine cylinder 80 communicates with an anti-fluctuation chamber through a pipe 82 and an orifice 83, the chamber 81 in turn communicating with a second chamber 84 through a pipe 85 and an orifice 86. Additional chambers may be provided if desirable, and these serve the function of successively damping the violent pressure changes in the cylinder to the average pressure existing therein. In other terms, then, the substantially constant pressure in the last chamber 84 is the M. E. P. of the engine. This pressure is communicated through a pipe 87 to a pressure reducer 88 which may be the same as the pressure reducer shown in the lower left hand part of Fig. 2. The pressure reducer communicates in turn, through a pipe 89, with a throttle control device 90 which may be the same device as 20 shown in Fig. 2. Alternately, control devices such as those shown in Figs. 4 and 5 may be substituted for the devices 88 and 90, any one of which carries the bell crank 22 by which throttle changes are effected in response to a pressure proportional to torque.

By utilizing the teachings of this invention constant torque operation of an engine is afforded, and when this is used in connection with a constant speed propeller in an aircraft engine, constant power operation is afforded.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What we claim is:

1. In an internal combustion engine including a throttle in combination, a plurality of serially connected pressure balancing chambers, a piston chamber open to the first chambers to receive a pressure therein proportional to the M. E. P. of the engine, a piston in said piston chamber, resilient means to urge said piston into said chamber against said pressure, wherefore pressure variations may move the piston against said resilient means, and means actuated by piston movement for opening and closing said throttle.

2. In an internal combustion engine including a throttle in combination, a balancing chamber connected to an engine cylinder, a pressure chamber connected to the balancing chamber to receive a pressure therein proportional to the M. E. P. of the engine, a piston in said pressure chamber, resilient means to urge said piston into said chamber against said pressure, wherefore pressure variations may move the piston against said resilient means, and means for adjusting said resilient means to establish a datum position for throttle adjustment according to M. E. P.

3. In an internal combustion engine including a throttle in combination, a balancing chamber openly connected to an engine cylinder, a pressure chamber restrictedly connected to the balancing chamber but open at all times thereto to receive a pressure therein proportional to the M. E. P. of the engine, a piston in said chamber, resilient means to urge said piston into said chamber against said pressure, wherefore pressure variations may move the piston against said spring, and a servo valve actuated by piston movement for opening and closing said throttle.

4. In an internal combustion engine including a throttle in combination, a fluid pressure device responsive to the pressure exerted thereby to the M. E. P. under which the engine is operating, a motor connected to said device, resilient means in the motor opposing the fluid pressure to balance the motor at a certain position, and means responsive to excursions of said motor from its certain position to actuate the engine throttle.

WILTON G. LUNDQUIST.
ROLAND CHILTON.